(12) United States Patent
Iacopetti et al.

(10) Patent No.: US 10,883,184 B2
(45) Date of Patent: Jan. 5, 2021

(54) METHOD AND APPARATUS FOR TREATMENT OF EFFLUENTS FROM PRODUCTION PLANTS OF EPOXY COMPOUNDS

(71) Applicant: INDUSTRIE DE NORA S.P.A., Milan (IT)

(72) Inventors: Luciano Iacopetti, Milan (IT); Giovanni Meneghini, Milan (IT); Gaetano Porcino, Pessano con Bornago (IT); Giuseppe Faita, Novara (IT)

(73) Assignee: INDUSTRIE DE NORA S.P.A., Milan (IT)

( * ) Notice: Subject to any disclaimer, the term of this patent is extended or adjusted under 35 U.S.C. 154(b) by 124 days.

(21) Appl. No.: 14/379,344

(22) PCT Filed: Mar. 27, 2013

(86) PCT No.: PCT/EP2013/056564
§ 371 (c)(1),
(2) Date: Aug. 18, 2014

(87) PCT Pub. No.: WO2013/144227
PCT Pub. Date: Oct. 3, 2013

(65) Prior Publication Data
US 2015/0014181 A1 Jan. 15, 2015

(30) Foreign Application Priority Data
Mar. 27, 2012 (IT) .............................. MI2012A0486

(51) Int. Cl.
*C25B 15/08* (2006.01)
*C01D 3/14* (2006.01)
(Continued)

(52) U.S. Cl.
CPC ................ *C25B 15/08* (2013.01); *C01D 3/06* (2013.01); *C01D 3/14* (2013.01); *C02F 1/20* (2013.01);
(Continued)

(58) Field of Classification Search
CPC . C01D 3/14; C01D 3/06; C02F 1/4674; C02F 2103/36; C02F 21/4674; C25B 1/20;
(Continued)

(56) References Cited

U.S. PATENT DOCUMENTS 4,126,526 A 11/1978 Kwon et al.
4,213,833 A * 7/1980 Lefevre ......................... 205/518
(Continued)

FOREIGN PATENT DOCUMENTS

FR 2963338 2/2012
WO WO 2005054167 A1 * 6/2005 ............. C07C 29/62
(Continued)

OTHER PUBLICATIONS

International Search Report issued in PCT Application No. PCT/EP2013/056564.
(Continued)

*Primary Examiner* — Alexander W Keeling
(74) *Attorney, Agent, or Firm* — Lucas & Mercanti, LLP

(57) ABSTRACT

The invention relates to a process of abatement of the organic content of a depleted brine coming from epoxy compound production involving a vapour stripping step and a mineralisation with hypochlorite in two steps, at distinct pH and temperature conditions.

11 Claims, 2 Drawing Sheets

(51) Int. Cl.
*C01D 3/06* (2006.01)
*C25B 1/34* (2006.01)
*C25B 3/02* (2006.01)
*C02F 1/20* (2006.01)
*C02F 1/467* (2006.01)
*C02F 103/36* (2006.01)

(52) U.S. Cl.
CPC .............. *C02F 1/4674* (2013.01); *C25B 1/34* (2013.01); *C25B 3/02* (2013.01); *C02F 2103/36* (2013.01); *C02F 2201/4612* (2013.01); *C02F 2201/4618* (2013.01); *C02F 2201/46115* (2013.01); *C02F 2201/46155* (2013.01); *C02F 2209/02* (2013.01); *C02F 2209/06* (2013.01); *C02F 2209/08* (2013.01)

(58) Field of Classification Search
CPC ..... C25B 1/24; C25B 1/26–1/265; C25B 1/34
See application file for complete search history.

(56) References Cited

U.S. PATENT DOCUMENTS

| 4,415,460 A | 11/1983 | Suciu et al. |
| 2010/0219372 A1 | 9/2010 | Hook et al. |

FOREIGN PATENT DOCUMENTS

| WO | 2008/152043 | 12/2008 |
| WO | 2009/095429 | 8/2009 |
| WO | WO 2012016872 A1 * | 2/2012 |
| WO | 2012/025468 | 3/2012 |

OTHER PUBLICATIONS

International Preliminary Report on Patentability issued in PCT Application No. PCT/EP2013/056564.

* cited by examiner

METHOD AND APPARATUS FOR TREATMENT OF EFFLUENTS FROM PRODUCTION PLANTS OF EPOXY COMPOUNDS

This application is a U.S. national stage of PCT/EP2013/056564 filed on Mar. 27, 2013 which claims the benefit of priority from Italy Patent Application No. MI20120A000486 filed Mar. 27, 2012, the contents of each of which are incorporated herein by reference.

FIELD OF THE INVENTION

The invention relates to treatment and recycling of a process electrolyte in the industrial synthesis of epoxy compounds and to the relevant production plant.

BACKGROUND OF THE INVENTION

Epoxy compounds such as propylene oxide and epichlorohydrin are essential components in the production of epoxy resins used for paints and artefacts including sophisticated ones, such as carbon fibre-reinforced materials increasingly used in the aeronautic industry.

The manufacturing processes of epoxy compounds are based on the scheme illustrated hereafter, providing the reaction of an unsaturated organic compound (indicated by the formula $CH_2=CH-R$ wherein R generally denotes an alkyl or chloroalkyl group) with chlorine and alkali, for instance caustic soda. The overall reaction takes place through a first step of hypochlorous acid (HClO) generation, a second step of hypochlorous acid addition to the double bond of the unsaturated compound with formation of the corresponding chlorohydrin (indicated as $CH_2Cl-CH(OH)-R$) and a third step of conversion of the chlorohydrin with caustic soda to form the end product—indicated hereafter as $CH_2-(O)-CH-R$ and expressed by structural formula (I)—and sodium chloride (depleted brine).

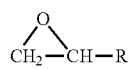
(I)

Reference will be explicitly made in the following to plants providing the coupling of the epoxy compound synthesis section to chlorine-caustic soda units, but it is understood that the same concepts apply to other chlor-alkali units (for instance chlorine-caustic potash electrolysis cells).

The overall reaction scheme of the epoxy compound production plant is reported hereafter.

chlorine-caustic soda unit:

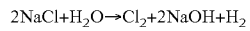

epoxidation section:

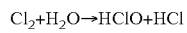

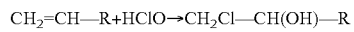

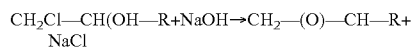

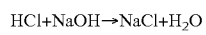

The reaction scheme indicates that chlorine and caustic soda are used in a 1:2 molar ratio.

The industrial processes of higher relevance relate to the production of propylene oxide, expressed by formula (I) with $R=CH_3$, and of epichlorohydrin, expressed by formula (I) with $R=CH_2Cl$, wherein the unsaturated compounds employed are respectively propylene ($CH_2=CH-CH_3$) and allyl chloride ($CH_2Cl-CH=CH_2$).

As it will be shown in the following, epichlorohydrin may also be manufactured by an alternative process based on the use of glycerol, $CH_2(OH)-CH(OH)-CH_2(OH)$, whose availability at convenient price is recently increasing. The process is articulated in three steps given by the combination of chlorine and oxygen to form gaseous hydrochloric acid (HCl), the reaction of glycerol with hydrochloric acid with production of dichlorohydrin ($CH_2Cl-CH(OH)-CH_2Cl$) and finally the conversion of dichlorohydrin to epichlorohydrin and depleted brine by means of caustic soda:

chlorine-caustic soda unit:

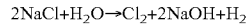

hydrochloric acid gas manufacturing unit:

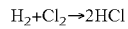

epoxidation section:

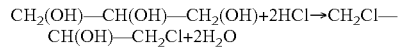

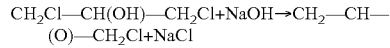

The reaction scheme indicates that chlorine and caustic soda are used in a 1:1 molar ratio.

Chlorine, hydrogen and caustic soda are manufactured in a diaphragm- or membrane-type chlorine-caustic soda unit installed upstream the epoxy compound production plant.

In all processes destined to produce epoxy compounds, particularly in the case of propylene oxide and epichlorohydrin, it is important to accomplish the recycling of the depleted brine to the upstream chlor-alkali unit: in fact, if the outlet brine is sent, as is the present case, to an external treatment plant, the amount of lost sodium chloride is about 100,000 t/y for a medium to big size capacity, with a consequent heavy economic impact on the plant management. The recycling of depleted brine is feasible however only provided the content of residual organic compounds (expressed in the following in terms of chemical oxygen demand, COD) is previously abated. Such operation is rather difficult to be carried out biologically due to the high saline content; moreover, being this treatment a typical low-intensive process, it would require huge volumes and surfaces, hardly compatible with the normal demands of production sites.

Patent application US-20100219372-A1 provides the COD abatement of depleted brines for epichlorohydrin production to be carried out by combining at least two treatments of different nature, among which a generic electrochemical treatment, a chemical oxidation for instance with chlorine and caustic soda and a crystallisation are listed. The inventors observed that, from a practical standpoint, the latter treatment is essential for obtaining an outlet brine which can effectively be recycled to the indicated process, i.e. having a final COD not exceeding 40 mg/l of oxygen. The crystallisation step is nevertheless lengthy and laborious, entailing the separation of sodium chloride crystals from the depleted brine with formation of a mother liquor, the redissolution of separated crystals to obtain clean brine, a more thorough crystallisation on a purge of the mother liquor and the recycling of the relevant salt. By combining such step with other chemical and electrochemical treatments mentioned in the specification, the brine obtained has an acceptable quality in terms of organic content, but too rich in chlorates (with a typical concentration in the order of magnitude of 1 g/l) and in chlorinated organic derivatives which are formed as a natural consequence of such treatments. The concentration of such by-products in the brine must be suitably adjusted by methods known in the art, for instance by adsorption on active carbons (abatement of chlorinated by-products) and by injection of sulphite in acidic environment (abatement of chlorates). The combination of treatments suggested in US-20100219372-A1 provides excessively high values of such by-products, making the relevant abatement treatments extremely penalising.

It has thus been evidenced the need for processes of restoration of depleted brines in epoxy compound production plants characterised by simplicity of operation, reduced size and reasonable cost.

SUMMARY OF THE INVENTION

Various aspects of the invention are set out in the accompanying claims.

Under one aspect, the invention relates to a process of reduction of the organic content of a depleted brine originated in the manufacturing of epoxy compounds by oxidation of an organic raw material with the products of a chlor-alkali electrolysis unit, comprising a first removal of a substantial fraction of residual organic compounds by vapour stripping of the depleted brine optionally at pH adjusted between 3 and 4 upon injection of a flow of water, followed by mineralisation (i.e. conversion down to carbon dioxide) by pre-oxidation with hypochlorite at pH 3.5 to 5 and at a temperature of 50-60° C. and final oxidation in the presence of hypochlorite at pH 3 to 4 and at a temperature of 80 to 95° C. The term hypochlorite is used herein and in the following to designate the hypochlorite species in salt form in equilibrium with hypochlorous acid at the relevant pH, as it will be evident to those skilled in the art. In particular, the vapour stripping step is used to withdraw the totality of volatile organic substances together with part of higher boiling ones; this can have the advantage of sensibly relieving the subsequent oxidation steps, reducing in particular the formation of chlorinated by-products during such phases. In one embodiment, the vapour stripping can abate the COD of a typical spent brine (normally higher than 10,000 and sometimes exceeding 30,000 mg/l of oxygen) down to a value of 2,000-4,000 mg/l of oxygen. Such residual quantity is suitable for being subjected to an oxidation treatment with hypochlorite; the inventors observed that carrying out such oxidation in two steps—that is a pre-oxidation step at slightly higher pH and low temperature, followed by thorough oxidation at lower pH and higher temperature—has the advantage of minimising the formation of chlorates (with a typical concentration of the order of magnitude of 0.1 g/l or lower) and of chlorinated by-products. The pre-oxidation is in fact capable of further reducing the COD, which in one embodiment is 800 to 1,500 mg/l of oxygen at the outlet of the pre-oxidation step. In one embodiment, the pre-oxidation step is effected by feeding chlorine and alkali, for instance caustic soda, optionally produced in the same chlor-alkali electrolysis unit providing the reactants for the oxidation of the organic raw material. This has the advantage of manufacturing the hypochlorite required for the pre-oxidation by means of reagents already present on site. In one embodiment, the pre-oxidation step is effected in an alkali brine electrolysis cell of undivided type commonly used in the manufacturing of hypochlorite.

The final oxidation step is carried out in the presence of hypochlorite at pH 3 to 4 and at a temperature of 80 to 95° C.; such process step provides a fresh brine, which in one embodiment is characterised by a COD not higher than 40 mg/l of oxygen, with a chlorate concentration not higher than 0.1 g/l and a moderate content of chlorinated by-products. The concentration of the two by-products may optionally be adjusted before recycling the brine to the plant by absorption treatments on active carbons and by injection of sulphite at pH controlled in an acidic range; such operations are made fully feasible by the much decreased amounts involved with respect to the processes of the prior art. Similarly to the case of pre-oxidation, in one embodiment the final oxidation step is effected by feeding chlorine and alkali, for instance caustic soda, optionally produced in the same chlor-alkali electrolysis unit providing the reactants for the oxidation of the organic raw material. In one embodiment, the final oxidation step is effected directly in the chlor-alkali electrolysis unit fed with fresh brine, provided the latter consists of a diaphragm cell. The term diaphragm cell is used herein to mean an electrolysis cell equipped with a non-asbestos type diaphragm separator comprising fluorinated polymer fibres and optionally inorganic materials such as zirconium oxide, as would be known to those skilled in the art. The inventors in fact surprisingly observed that such brine stream can be fed into the anolyte of diaphragm cells without any problem, since the semi-permeable nature of the diaphragm causes hypochlorite to be locally produced within the anolyte itself, such hypochlorite comprising a remarkable fraction of hypochlorous acid in view of the acidic environment (pH 3-4), in an amount such that it oxidises a major part of residual organics in situ. This solution is conversely not applicable if the chlor-alkali electrolysis unit is of different type, for instance in the case of cells equipped with ion-exchange membranes as the separator (membrane cells): in fact, feeding a brine with a COD of few hundreds mg/l of oxygen as obtainable in the pre-oxidation step according to the invention would bring about serious malfunctioning of ion-exchange membranes and of anodes in time. Thus, the final oxidation step in this case must be carried out in a separate unit, upstream the cell, by feeding chlorine and alkali as already mentioned or, in a further embodiment, in a unit consisting of an alkali brine electrolysis cell of undivided type commonly used in the manufacturing of hypochlorite.

Under another aspect, the invention relates to a synthesis plant of an epoxy compound comprising a chlor-alkali electrolysis unit fed with fresh brine, a depleted brine vapour stripping unit, a unit of pre-oxidation with hypochlorite. In one embodiment, the pre-oxidation unit consists of an alkali brine electrolysis cell of undivided type commonly used in the manufacturing of hypochlorite. In one embodiment, the chlor-alkali electrolysis unit consists of an electrolysis cell equipped with a non-asbestos type diaphragm separator comprising fluorinated polymer fibres. In one alternative embodiment, the plant further comprises a final oxidation unit consisting of a reactor fed with chlorine and caustic soda and the chlor-alkali electrolysis unit consists of a membrane-type electrolysis cell.

Some implementations exemplifying the invention will now be described with reference to the attached drawing, which has the sole purpose of illustrating the reciprocal arrangement of the different elements relatively to said particular implementations of the invention; in particular, drawings are not necessarily drawn to scale.

DETAILED DESCRIPTION OF THE DRAWINGS

Figure 1:
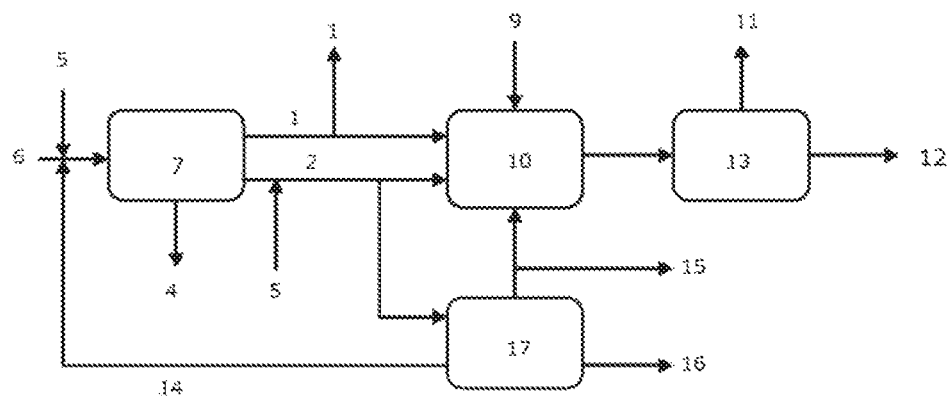
FIG. 1 shows a scheme of production of propylene oxide according to the prior art comprising a chlor-alkali electrolysis unit in which depleted brine is sent to an external treatment plant.

The scheme shown in FIG. 1 indicates that a propylene oxide production plant according to the prior art comprises a chlor-alkali unit 7, for instance a diaphragm- or membrane-type chlorine-caustic soda cell, fed with brine obtained by dissolving a solid salt 6, for instance sodium chloride, into water 5, with optional reintegration of recycled salt 14. The products of the chloralkali unit consist of chlorine 1, catholyte 2—which in the case of a diaphragm chlorine-caustic soda cell indicatively contains 15% NaOH and 15% NaCl and in the case of a membrane chlorine-caustic soda cell contains a 32% by weight aqueous solution of caustic soda—and hydrogen 4. Chlorine 1 and catholyte 2, optionally diluted with water 5, are fed to the propylene oxide unit 10, where they react with propylene 9 according with the above described reaction scheme. The reaction mixture is sent to a separation unit 13 which extracts propylene oxide 11 and discharges depleted brine 12 corresponding in this case to the whole amounts of chlorine and caustic soda produced in the chlor-alkali unit. In this scheme it is assumed that depleted brine 12, containing sensible amounts of organic substances besides 20-25% NaCl, is sent to an external treatment for compliance with the environmental norms applicable to industrial waste waters. In the case of a diaphragm electrolysis unit, catholyte 2, instead of being fed directly to reactor 10, may be sent to evaporator 17 from which solid salt to be recycled 14, concentrated NaOH 15 to be injected into reactor 10 after dilution with water 5 and condensate 16 are extracted. This alternative allows avoiding introducing NaCl together with NaOH into reactor 10 and is used in case the electrolysis unit is oversized with respect to the requirement of propylene oxide production: in this case additional concentrated caustic soda 15 and chlorine 1 are sent to other final users.

Figure 2:
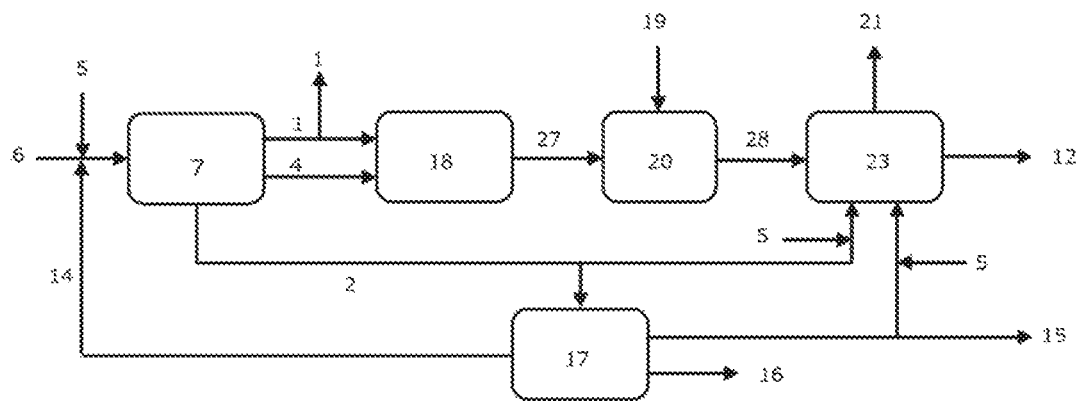
FIG. 2 shows a scheme of production of epichlorohydrin according to the prior art comprising a chlor-alkali electrolysis unit in which depleted brine is sent to an external treatment plant.

The scheme shown in FIG. 2 refers to an epichlorohydrin production plant utilising glycerol as raw material. The plant comprises a diaphragm- or membrane-type chlor-alkali electrolysis unit 7 fed with imported solid salt 6 and recycled solid salt 14 dissolved in water 5. The products of the chlor-alkali electrolysis unit are the same as the case shown in FIG. 1. In the case of a diaphragm cell unit, the fraction of catholyte 2 exceeding the requirement of epichlorohydrin production is fed to an evaporation-crystallisation section 17 from which are extracted solid salt to be recycled 14, concentrated NaOH 15 to be exported and condensate 16. There is also the possibility of feeding all of catholyte 2 to the evaporation-crystallisation unit 17: in such case, the required fraction of concentrated NaOH 15 is sent to saponifier 23 after dilution with water 5 while the fraction exceeding the requirement of saponification is exported. Such an alternative avoids feeding sodium chloride together with caustic soda into saponifier 23.

In the case of a membrane cell unit, the fraction of catholyte 2 exceeding the requirement of epichlorohydrin production is fed to a concentration section (not shown in the figure) from which NaOH is extracted at a commercial weight concentration of 50%.

The evaporation-crystallisation and concentration units are also needed in case the electrolysis unit is oversized with respect to the requirement of epichlorohydrin production: in this case additional concentrated caustic soda and chlorine are sent to other final users.

Chlorine and hydrogen are combined in combustion unit 18 where anhydrous HCl 27 sent to subsequent unit 20 is produced: here dichlorohydrin 28 is obtained by reacting gaseous hydrochloric acid with glycerol 19. Dichlorohydrin is reacted with catholyte in saponifier 23 from which epichlorohydrin 21 and depleted brine 12, containing relevant amounts of organic substances besides 20-25% of NaCl, are extracted. Depleted brine 12 is sent to an external treatment.

Figure 3:
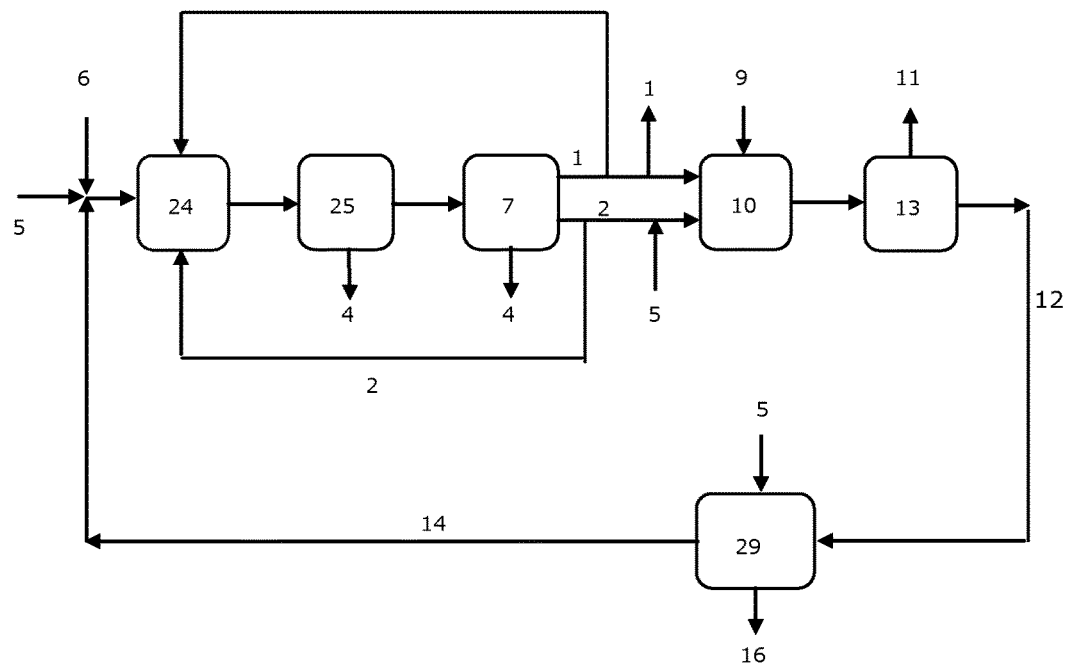
FIG. 3 shows a scheme of production of propylene oxide according to the invention comprising a membrane chlor-alkali electrolysis unit.

The scheme shown in FIG. 3 illustrates an embodiment of the present invention applicable to propylene oxide plants comprising a membrane-type chlor-alkali electrolysis unit 7, in the following referred to as chlorine-caustic soda unit. In this case depleted brine 12, separated from propylene oxide 11, has a typical COD of 2,500-3,000 mg/l of oxygen and must be treated to a target value of 20-40 mg/l of oxygen in order to be recycled while preventing membrane decay and possible anode malfunctioning. For this purpose, depleted brine 12 is fed to a vapour stripping unit 29. The operation is carried out so as to concentrate the depleted brine to near saturation, preferably without reaching the stage of solid salt separation. Inventors observed that vapour stripping, particularly if carried out adjusting pH around 3-4 by hydrochloric acid addition, allows strongly decreasing COD: by operating in this range with an outlet brine having a COD of about 2,500-3,000 mg/l of oxygen a solution with a residue of about 1,000-1,500 mg/l of oxygen can be obtained. It was found that the residual COD depends, besides the initial COD, on the amount of water 5 injected into catholyte 2: such amount of water dictates in fact the vapour flow-rate in 29 and thus the efficiency of the stripping action. Additional water may optionally be injected directly into stripping unit 29. The solution at the vapour stripping outlet 29 is subsequently fed to a pre-oxidation unit 24 supplied in this case with chlorine and caustic soda at 1:2 molar ratio with a 2-4 stoichiometric excess with respect to organics to be abated: pre-oxidation unit 24 operates at pH 3.5 to 5 and at a temperature of 50 to 60° C. In these conditions it was possible to easily decrease the residual COD down to values of 400-600 mg/l of oxygen, with an extremely reduced content of chlorates and chlorinated by-products. The solution exiting pre-oxidation unit 24 is then fed to final oxidation unit 25 consisting in this case of an undivided type electrolyser for hypochlorite solution manufacturing, working in optimum operating conditions at pH adjusted in the range 3-4 and at a temperature of 80-95° C. In these conditions, an outlet brine with a COD varying between 20 and 40 mg/l of oxygen could be obtained from the final oxidation unit 25, compatible with the correct operation of membranes and anodes of the membrane electrolysis unit.

Figure 4:
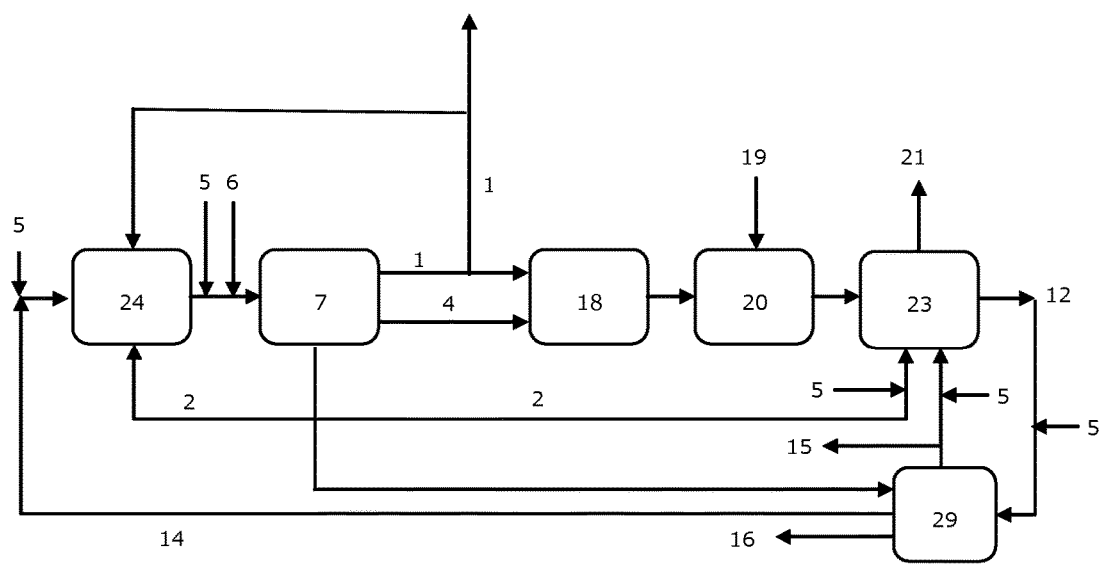
FIG. 4 shows a scheme of production of epichlorohydrin from glycerol according to the invention comprising a diaphragm chlor-alkali electrolysis unit.

FIG. 4 shows an embodiment of the invention relative to an epichlorohydrin manufacturing plant comprising a-type chlor-alkali electrolysis unit 7, in the following referred to as chlorine-caustic soda unit, of the type equipped with a non-asbestos diaphragm based on fluorinated polymer fibres. In this case depleted brine 12, typically characterised by high COD values, for instance 10,000-30,000 mg/l of oxygen, is sent as first treatment step to stripping unit 29. Inventors could detect residual COD values in outlet solution 14 below 4,000 mg/l of oxygen and always comprised between 2,000 and 3,000 mg/l of oxygen by maintaining the pH in the range 3-4 during the stripping step and by injecting additional water directly into stripping unit 29. The outlet solution of vapour stripping unit 29 is subsequently sent to a pre-oxidation unit 24 fed with chlorine and caustic soda at 1:1 molar ratio with a 2-4 stoichiometric excess with respect to organics to be abated: pre-oxidation unit 24 operates at pH 3.5 to 5 and at a temperature of 50 to 60° C. In these conditions it was possible to easily decrease the residual COD down to values of 800-1,000 mg/l of oxygen, with an extremely reduced content of chlorates and chlorinated by-products. The solution exiting pre-oxidation unit 24, added with the required salt 6 and water 5, is then fed to a final oxidation unit coinciding in this case with diaphragm-type chlorine-caustic soda unit 7: by maintaining the pH of the diaphragm cell unit anodic compartments at 3-4 and the temperature at 90-95° C., is was then possible to obtain caustic soda 2 at the outlet with a residual COD of only 20-40 mg/l of oxygen, with no significant build-up of chlorinated by-products and chlorates in the production cycle. Inventors further observed that upon by-passing pre-oxidation unit 24 from the cycle and carrying out a single stage oxidation inside diaphragm-type chlorine-caustic soda unit 7, the COD of caustic soda at the outlet is never lower than 500-1,000 mg/l of oxygen, moreover with a progressive build-up of chlorates and chlorinated by-products.

The previous description shall not be intended as limiting the invention, which may be used according to different embodiments without departing from the scopes thereof, and whose extent is solely defined by the appended claims.

Throughout the description and claims of the present application, the term "comprise" and variations thereof such as "comprising" and "comprises" are not intended to exclude the presence of other elements, components or additional process steps.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention before the priority date of each claim of this application.

The invention claimed is:

1. A process of treatment in a plant comprising a chlor-alkali electrolysis unit, upstream of the chlor-alkali electrolysis unit comprising a pre-oxidation unit and an oxidation unit, the process consisting of the following sequential steps:
   a) feeding fresh brine to the chlor-alkali electrolysis unit to obtain products;
   b) oxidizing an organic raw material with the products obtained from step a), thereby obtaining an epoxy compound and a depleted brine;
   c) extracting a waste stream consisting of the depleted brine from step b) and vapor stripping the waste stream to obtain a vapor-stripped stream;
   d) pre-oxidating the vapor-stripped stream from step c) in the pre-oxidation unit with hypochlorite at pH 3.5 to 5 and at a temperature of 50 to 60° C.;
   e) followed by oxidating the material from step d) in the oxidation unit by further adding hypochlorite at pH 3 to 4 and at a temperature of 80 to 95° C. until obtaining a fresh brine; and
   f) feeding the fresh brine obtained from step e) to the chlor-alkali unit in step a).

2. The process according to claim 1 wherein said depleted brine has a COD higher than 10,000 mg/l of oxygen at an inlet of step c) and of 2,000 to 4,000 mg/l of oxygen at an outlet of step c).

3. The process according to claim 1 wherein said depleted brine has a COD of 400 to 1,500 mg/l of oxygen at an outlet of step d).

4. The process according to claim 1 wherein said fresh brine at an outlet of step e) has a COD not higher than 40 mg/l of oxygen.

5. The process according to claim 1 wherein said organic raw material is selected from the group consisting of propylene, allyl chloride and glycerine and said epoxy compound is propylene oxide or epichlorohydrin.

6. The process according to claim 1 wherein said pre-oxidation step with hypochlorite is carried out by feeding chlorine and alkali.

7. The process according to claim 1 wherein said pre-oxidation unit is an electrolysis cell of the undivided type.

8. The process according to claim 1 wherein said oxidation unit is an electrolysis cell.

9. The process according to claim 8 wherein said electrolysis cell is an alkali brine electrolysis cell of the undivided type.

10. The process according to claim 1 wherein said oxidation unit is a chlor-alkali electrolysis unit, consisting of an electrolysis cell equipped with a non-asbestos diaphragm separator comprising fluorinated polymer fibers.

11. The process according to claim 1, wherein said vapor stripping step takes place at pH adjusted between 3 and 4.

* * * * *